United States Patent Office 3,709,857
Patented Jan. 9, 1973

---

3,709,857
NEUTRAL CURE WET STRENGTH RESINS PREPARED BY POLYMERIZING GLYOXALOLATED ACRYLAMIDE WITH FURTHER ACRYLAMIDE AND A BASIC, NITROGEN-CONTAINING MONOMER
Robert W. Faessinger, Media, Pa., assignor to Scott Paper Company, Delaware County, Pa.
No Drawing. Filed Feb. 25, 1971, Ser. No. 118,952
Int. Cl. C08g 9/02; D21h 3/52
U.S. Cl. 162—167                    5 Claims

ABSTRACT OF THE DISCLOSURE

High molecular weight, pH independent, thermosetting, cationic, wet strength resins are prepared by a two-stage process which comprises, first, reacting glyoxal with acrylamide and then polymerizing the glyoxalolated acrylamide with acrylamide in the presence of a basic nitrogen-containing monomer. These resins are useful in the preparation of paper products having improved, off-machine dry strength and wet strength properties.

BACKGROUND OF THE INVENTION

Field of the invention

The present invention relates, generally, to novel high molecular weight, pH independent, thermosetting, cationic, wet strength resins; to a process for preparing said resins; to a process for treating paper with said resins to improve the off-machine wet strength and dry strength thereof; and to a paper product having improved wet and dry strength properties. More particularly this invention relates to high molecular weight, pH independent, thermosetting, cationic, wet strength resins prepared by reacting glyoxal with acrylamide and polymerizing the glyoxalolated acrylamide obtained with acrylamide in the presence of a basic nitrogen-containing monomer, and to paper with improved wet and dry strength properties which has been treated with said resins.

Description of the prior art

In a conventional papermaking operation cellulosic fibers are dispersed in water, drained on a wire screen, pressed into close physical contact and dried. The result is a paper sheet in which the individual fibers are held together by hydrogen bonds which give strength to the dry sheet. When the dry sheet is wet, these hydrogen bonds are broken and the paper loses most of its strength.

To prevent this strength loss, various chemical treatments have been employed. Among the most successful treatments is the use of synthetic resins which, when added to the cellulosic fibers, either before or after a sheet is formed therefrom, and cured or polymerized, can significantly increase the wet strength of the sheet. Most commonly used are the urea formaldehyde and melamine formaldehyde type resins. With these types of resins, curing under acidic conditions is required. This is most often accomplished by storing paper incorporating the resins at ambient temperatures for a period of days during which time the wet strength develops, or by the application of heat which can accelerate the cure rate to a matter of minutes. Because of the acidic requirements for cure, it is necessary to produce these papers at a pH of from about 4 to about 5, leading to several serious drawbacks, including corrosion of the papermaking equipment and premature embrittlement of the paper produced. The polyamide-epichlorohydrin wet strengthening resins, which are somewhat in less common usage than the formaldehyde-based resins, can be cured under conditions which are independent of the pH of the treated web. However, papers incorporating these resins also require an aging period at ambient temperatures to achieve maximum strength development, which development may also be accelerated by the application of heat. The application of heat, or a prolonged storage period for strength development can prove to be a serious handicap to rapid production, and could create inventory problems, especially in the winter season in northern climes.

To overcome these problems, resins formed by reacting glyoxal with vinylamide polymers, such as those disclosed in U.S. Pat. 3,556,932, have been suggested. Such resins formed by reacting glyoxal with polyvinylamides are difficult to prepare in the desired molecular weight range, since crosslinking and rapid gelation can cause insolubilization of the polymeric species with a subsequent loss in their wet strengthening characteristics. In addition, papers incorporating these resins rapidly lose wet strength even under mild alkaline conditions such as are found in solutions of household ammonia, certain soaps and other household cleaners.

Other disadvantages, such as excessive adhesion of the treated paper to drier surfaces, corrosion of drier surfaces, and shortened Fourdrinier wire and doctor blade life have also been encountered in the preparation of paper products incorporating the heretofore available wet strength producing resins.

SUMMARY OF THE INVENTION

In accordance with the present invention high molecular weight, pH independent, thermosetting, cationic wet strength resins are prepared by a two-step process. In the first stage, glyoxal is reacted with acrylamide under mildly alkaline conditions and this reaction product is, in the second stage, polymerized with acrylamide in the presence of a basic nitrogen-containing monomer which will impart a cationic character to the resulting polymer. The resulting cationic acrylamide-glyoxalolated acrylamide polymer is water soluble and may be employed in the preparation of cellulosic webs, such as paper, to yield immediate maximum off-machine wet tensile, improved dry tensile, improved broke-recovery after the finishing operation, reduced yankee drier adhesion which results in fiber rupture and strength losses, longer life of the forming wire and doctor blade, and improved wet-web-strength resulting in less machine breaks with costly down-time.

DESCRIPTION OF THE PREFERRED EMBODIMENTS

According to the present invention an aqueous solution of cationic acrylamide-glyoxalolated acrylamide polymer is prepared in two stages. In the first stage, glyoxal and acrylamide are reacted to produce a glyoxalolated acrylamide, believed to have the following structure:

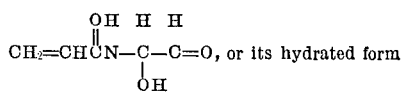

This reaction may be carried out in an aqueous medium. However, it has been found that better control of the polymerization reaction is possible, and a more stable resin system results, when an aliphatic alcohol is present. Because of its boiling point, complete miscibility with water, and its relatively low cost, isopropanol is an especially preferred alcohol although methanol, ethanol or other water miscible mono- and polyhydrin alcohols can be employed. The alcohol content of the polymerization medium can be from as low as 1% up to about 50% of the total weight of the medium. It is preferred to employ an alcohol content in the range of from about 8% to about 25%. This first stage reaction is preferably carried out at a temperature of from about 60° C. to about 80° C. for from about 5 to about 20 minutes. The pH of the reaction medium is preferably about 9. In most instances, the pH of the solution can be adjusted to about 9 by the addition of a basic nitrogen-containing monomer, in an amount which is necessary to achieve the desired cationic character of the finished polymer. Basic monomers such as N,N - dimethylaminoethylmethacrylate, N,N - diethylaminoethylmethacrylate, N,N - dimethylaminoethylacrylate, N,N-diethylaminoethylacrylate, 2-vinylpyridine, 4-vinylpyridine, and N-(t-butyl)-aminoethylmethacrylate are the preferred reagents. Inorganic bases such as sodium hydroxide, sodium carbonate, sodium silicate, and the like, may be added in addition to one of the basic monomers listed above to achieve the desired pH. If an inorganic base is used for pH control, instead of the basic monomer, the required amount of basic monomer may be added just prior to the acidification and second-stage reaction with acrylamide. The amount of the basic nitrogen-containing monomer may be from about 0.0005 mole to about 0.05 mole for each mole of acrylamide employed in both the first and second stages. It is preferred to use an amount in the range of from about 0.001 mole to about 0.01 mole for each mole of acrylamide.

In the second stage, which begins after the glyoxalolated acrylamide is formed, the pH is adjusted to from about 3.6 to about 5.0 with a dilute (5–10%) mineral acid, such as sulfuric acid, or other acidic material, and an additional amount of acrylamide is added along with sodium bisulfite in an amount equal to about 0.3% of the total weight of acrylamide used. The amount of glyoxalol acrylamide can be equal to from about 3% to about 90% of the polymerization mixture. A glyoxalol acrylamide content of from about 6% to about 50% is especially preferred. Water is then added in an amount sufficient to adjust the dissolved solids content of the polymerization mixture to about 10–11% by weight. The resulting solution is heated, with stirring, at a temperature of from about 30° C. to about 100° C. and a free radical polymerization is initiated by adding an oxidizing agent, such as ammonium persulfate, in an amount equal to about 0.3% of the weight of the acrylamide employed in both the first and second stages. The oxidizing agent can be added all at once, or in several, spaced, partial charges. The polymerization mixture is maintained at a temperature of from about 50° C. to about 90° C. until the viscosity increases to the point of incipient gelation. This point is usually characterized by such things as the disappearance of the vortex formed by the stirring action of the agitator, and the tendency for the liquid to cling and entwine about the shaft of the stirrer. This latter phenomenon is usually referred to as "roping." At this point, water is added in an amount sufficient to thin out the highly viscous reaction solution and to produce a solution having a solids content of about 5–6%. In addition, a water soluble polymerization inhibitor, such as hydroquinone, is added in an amount sufficient to terminate the polymerization and to stabilize the resultant resin solution. This resin solution can be employed in conventional papermaking operations without further modification.

Resins prepared in accordance with this process can be incorporated into wood pulp by adding them to aqueous suspensions of paper stock or furnish in the beater, stock chest, jordan, fan pump, headbox or at any other suitable point ahead of the Fourdrinier wire or sheet-forming stage. While these resins are primarily intended for use as a beater-additive type of wet strength producing resin, they may also be incorporated into an already formed paper sheet by padding, spraying, immersing, printing, etc. An advantageous amount of resin added to the paper sheet constitutes from about 0.1% to about 10.0% resin solids based on the dry weight of the paper. A range of from about 0.1% to about 6.0% is preferred. However, the amount may be varied to suit the particular need. Paper and pulp slurries having a pH below about 9.0 may be effectively treated with these resins.

In order to describe the present invention so that it may be more clearly understood, the following examples are set forth. These examples are set forth primarily for the purpose of illustration, and any specific enumeration of detail contained therein should not be interpreted as a limitation on the concept of this invention.

EXAMPLE 1

Into a reaction flask equipped with a mechanical stirrer, thermometer, addition funnel and reflux condenser were placed 18.0 grams of acrylamide, 36.0 grams of a 40% by weight solution of glyoxal in water, 75.0 grams of isopropyl alcohol, 250.0 grams of water and 1.3 grams of N,N - dimethylaminoethylmethacrylate. The reaction mixture was slowly heated and maintained at 60°–70° C. for about 10 minutes.

The pH of the mixture was adjusted to about 4.0 to 4.5 with 3.5 grams of 10% sulfuric acid in 25.0 grams of water. The mixture was maintained at between 55° C. and 70° C. for about 10 minutes. At the end of this time 18.0 grams of acrylamide, 0.1 gram of sodium bisulfite and 100 grams of water were added and the mixture was maintained at 50° to 60° C. for an additional 10 minutes. Following the addition of 10.0 grams of a 0.125% aqueous solution of ammonium persulfate the reaction mixture was slowly heated to reflux (87° C.) until the resin solution became a viscous syrup at the point of incipient gelation (about 60 minutes). 485.0 grams of water and 1.5 grams of hydroquinone were then added to thin out the mixture and prevent further polymerization. When cooled to room temperature there resulted an aqueous solution of a cationic acrylamide glyoxal polymer having a viscosity of 9.5 centistokes at 25° C., a pH of 3.5 and a nonvolatile solids content of 5.2%.

EXAMPLE 2

Into a reaction flask equipped with a mechanical stirrer, thermometer, addition funnel and reflux condenser were placed 29.2 grams of acrylamide, 8.0 grams of a 40% by weight solution of glyoxal in water, 75.0 grams of isopropyl alcohol, 266.8 grams of water and 1.3 grams of N,N-dimethylaminoethylmethacrylate. The reaction mixture was slowly heated and maintained at 60°–70° C. for about 15 minutes.

The pH of the mixture was adjusted to about 4.0 to 4.5 with 3.5 grams of 10% sulfuric acid in 2.5 grams of water. The mixture was maintained at about 65° C. for about 6 minutes. At the end of this time 18.0 grams of acrylamide, 0.1 grams of sodium bisulfite and 100 grams of water were added and the mixture was maintained at 50° to 60° C. for an additional 5 minutes. Following the addition of 10 grams of a 0.125% aqueous solution of ammonium persulfate the reaction mixture was slowly heated to 68° C. until the resin solution became a viscous syrup at the point of incipient gelatin (about 35 minutes). 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 18.7 centistokes at 25° C., a pH of 4.5 and a non-volatile solids content of 4.0%.

EXAMPLE 3

Into a reaction flask equipped with a mechanical stirrer, thermometer, addition funnel and reflux condenser were placed 24.3 grams of acrylamide, 20.3 grams of a 40% by weight solution of glyoxal in water, 75.0 grams of isopropyl alcohol, 259.4 grams of water and 1.3 grams of N,N-dimethylaminoethylmethacrylate. The reaction mixture was slowly heated and maintained at 60°–70° C. for about 15 minutes.

The pH of the mixture was adjusted to about 4.0 to 4.5 with 3.5 grams of 10% sulfuric acid in 2.5 grams of water. The mixture was maintained at about 60° C. for about 5 minutes. At the end of this time 18.0 grams of acrylamide, 0.1 gram of sodium bisulfite and 100 grams of water were added and the mixture was maintained at 50° to 60° C. for an additional 5 minutes. Following the addition of 10 grams of a 0.125% aqueous solution of ammonium persulfate the reaction mixture was slowly heated to 60° C. until the resin solution became a viscous syrup at the point of incipient gelatin (about 25 minutes). 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 12.8 centistokes at 25° C., a pH of 4.2 and a non-volatile solids content of 4.6%.

EXAMPLE 4

Into a reaction flask equipped with a mechanical stirrer, thermometer, addition funnel and reflux condenser were placed 20.2 grams of acrylamide, 33.8 grams of a 40% by weight solution of glyoxal in water, 75.0 grams of isopropyl alcohol, 250.0 grams of water and 1.3 grams of N,N-dimethylaminoethylmethacrylate. The reaction mixture was slowly heated and maintained at 60°–70° C. for about 15 minutes.

The pH of the mixture was adjusted to about 4.0 to 4.5 with 3.5 grams of 10% sulfuric acid in 2.5 grams of water. The mixture was maintained at about 70° C. for about 5 minutes. At the end of this time 18.0 grams of acrylamide, 0.1 gram of sodium bisulfite and 100.0 grams of water were added and the mixture was maintained at 60° to 70° C. for an additional 5 minutes. Following the addition of 26 grams of a 0.125% aqueous solution of ammonium persulfate over a perior of 62 minutes, during which time the reaction mixture was slowly heated to about 85° C., the resin solution became a viscous syrup at the point of incipient gelation. 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 9.0 centistokes at 25° C., a pH of 4.3 and a non-volatile solids content of 5.0%.

EXAMPLE 5

Into a reaction flask equipped with a mechanical stirrer, thermometer, addition funnel and reflux condenser were placed 8.1 grams of acrylamide, 60.8 grams of a 40% by weight solution of glyoxal in water, 75.0 grams of isopropyl alcohol, 235.0 grams of water and 1.3 grams grams of N,N-dimethylaminoethylmethacrylate. The reaction mixture was slowly heated and maintained at 60°–70° C. for about 15 minutes.

The pH of the mixture was adjusted to about 4.0 to 4.5 with 3.5 grams of 10% sulfuric acid in 2.5 grams of water. The mixture was maintained at between 60° C. and 70° C. for about 5 minutes. At the end of this time 18.0 grams of acrylamide, 0.1 gram of sodium bisulfite and 100 grams of water were added and the mixture was maintained at 60° to 70° C. for an additional 5 minutes. Following the addition of 46.0 grams of a 0.125% aqueous solution of ammonium persulfate over a 92 minute period, during which time the reaction mixture was slowly heated to about 85° C., the resin solution became a viscous syrup at the point of incipient gelation. 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 12.8 centistokes at 25° C., a pH of 3.9 and a non-volatile solids content of 5.9%.

EXAMPLE 6

Into a reaction flask equipped with a mechanical stirrer, thermometer, addition funnel and reflux condenser were placed 18.0 grams of acrylamide, 36.0 grams of a 40% by weight solution of glyoxal in water, 75.0 grams of isopropyl alcohol, 250.0 grams of water and 4.0 grams of N,N-dimethylaminoethylmethacrylate. The reaction mixture was slowly heated and maintained at 60°–70° C. for about 15 minutes.

The pH of the mixture was adjusted to about 4.0 to 4.5 with 10.8 grams of 10% sulfuric acid. The mixture was maintained at between 60° C. and 70° C. for about 5 minutes. At the end of this time 18.0 grams of acrylamide, 0.1 gram of sodium bisulfite and 100 grams of water were added and the mixture was maintained at 60° C. to 70° C. for an additional 5 minutes. Following the addition of 10 grams of a 0.125% aqueous solution of ammonium persulfate the reaction mixture was slowly heated to 71° C. until the resin solution became a viscous syrup at the point of incipient gelation (about 13 minutes). 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 8.2 centistokes at 25° C., a pH of 3.8 and a non-volatile solids content of 5.7%.

EXAMPLE 7

Into a reaction flask equipped with a mechanical stirrer, thermometer, addition funnel and reflux condenser were placed 18.0 grams of acrylamide, 36.0 grams of a 40% by weight solution of glyoxal in water, 75.0 grams of isopropyl alcohol, 75.0 grams of water and 2.5 grams of N,N-dimethylaminoethylmethacrylate. The reaction mixture was slowly heated and maintained at 60°–70° C. for about 15 minutes.

The pH of the mixture was adjusted to about 4.0 to 4.5 with 6.8 grams of 10% sulfuric acid in 50.0 grams of water. Then 18.0 grams of acrylamide, 0.1 grams of sodium bisulfite and 100.0 grams of water were added and the mixture was maintained at about 50° C. for about 5 minutes. Following the addition of 5.0 grams of a 0.125% aqueous solution of ammonium persulfate the reaction mixture was slowly heated to 78° C. until the resin solution became a viscous syrup at the point of incipient gelation (about 24 minutes). 600.0 grams of water and 1.5 grams of hydroquinone were then added to thin out the mixture and prevent further polymerization. When cooled to room temperature there resulted an aqueous solution of a cation acrylamide glyoxal polymer having a viscosity of 6.2 centistokes at 25° C., a pH of 3.9 and a non-volatile solids content of 4.8%.

EXAMPLE 8

Into a reaction flask equipped with a mechanical stirrer, thermometer, addition funnel and reflux condenser were placed 18.0 grams of acrylamide, 36.0 grams of a 40% by weight solution of glyoxal in water, 75.0 grams of isopropyl alcohol, 250.0 grams of water and 0.15 gram of N,N-dimethylaminoethylmethacrylate. The reaction mixture was slowly heated and maintained at 60°–70° C. for about 15 minutes.

The pH of the mixture was adjusted to about 4.0 to 4.5 with 0.4 gram of 10% sulfuric acid in 0.6 gram of water. The mixture was maintained at about 60° C. for about 2 minutes. At the end of this time 18.0 grams of acrylamide, 0.1 gram of sodium bisulfite and 100 grams of water were added and the mixture was maintained at 55° to 60° C. for an additional 10 minutes. Following the addition of 10.0 grams of a 0.125% aqueous solution of ammonium persulfate the reaction mixture was slowly heated to 78° C. until the resin solution became a viscous syrup at the point of incipient gelation (about 103 minutes). 385.0 grams of water and 1.5 grams of hydroquinone were than added to thin out the mixture and prevent further polymerization. When cooled to room temperature there resulted an aqueous solution of a cationic acrylamide glyoxal polymer having a viscosity of 13.7 centistokes at 25° C., a pH of 4.4 and a non-volatile solids content of 6.0%.

EXAMPLE 9

Into a reaction flask equipped with a mechanical stirrer, thermometer, addition funnel and reflux condenser were placed 18.0 grams of acrylamide, 36.0 grams of a 40% by weight solution of glyoxal in water, 150.0 grams of isopropyl alcohol, 175.0 grams of water and 1.3 grams of N,N-dimethylaminoethylmethacrylate. The reaction mixture was slowly heated and maintained at 60°–70° C. for about 15 minutes.

The pH of the mixture was adjusted to about 4.0 to 4.5 with 3.5 grams of 10% sulfuric acid in 2.5 grams of water. The mixture was maintained at about 61° C. for about 3 minutes. At the end of this time 18.0 grams of acrylamide, 0.1 gram of sodium bi-sulfite and 100 grams of water were added and the mixture was maintained at 55° to 63° C. for an additional 7 minutes. Following the addition of 21.0 grams of a 0.125% aqueous solution of ammonium persulfate over a period of 43 minutes, during which time the reaction mixture was slowly heated to 80° C., the resin solution became a viscous syrup at the point of incipient gelation. 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 4.5 centistokes at 25° C., a pH of 4.5 and a non-volatile solids content of 5.0%.

EXAMPLE 10

Into a reaction flask equipped with a mechanical stirrer, thermometer, addition funnel and reflux condenser were placed 18.0 grams of acrylamide, 36.0 grams of a 40% by weight solution of glyoxal in water, 37.5 grams is isopropyl alcohol, 287.0 grams of water and 1.3 grams of N,N-dimethylaminoethylmethacrylate. The reaction mixture was slowly heated and maintained at 60°–70° C. for about 8 minutes.

The pH of the mixture was adjusted to about 4.0 and 4.5 with 3.4 grams of 10% sulfuric acid in 25.0 grams of water. The mixture was maintained at about 64° C. for about 3 minutes. At the end of this time 18.0 grams of acrylamide, 0.1 gram of sodium bisulfite and 100.0 grams of water were added and the mixture was maintained at 52° C. for an additional 3 minutes. Following the addition of 10.0 grams of a 0.125% aqueous solution of ammonium persulfate the reaction mixture was slowly heated to 74° C. until the resin solution became a viscous syrup at the point of incipient gelation (about 30 minutes). 485.0 grams of water and 1.5 grams of hydroquinone were then added to thin out the mixture and prevent further polymerization. When cooled to room temperature there resulted an aqueous solution of a cationic acrylamide glyoxal polymer having a viscosity of 10.5 centistokes at 25° C., a pH of 4.0 and a non-volatile solids content of 4.4%.

EXAMPLE 11

Into a reaction flask equipped with a mechanical stirrer, thermometer, addition funnel and reflux condenser were placed 18.0 grams of acrylamide, 36.0 grams of a 40% by weight solution of glyoxal in water, 18.7 grams of isopropyl alcohol, 306.0 grams of water and 1.3 grams of N,N-dimethylaminoethylmethacrylate. The reaction mixture was slowly heated and maintained at 60°–70° C. for about 15 minutes.

The pH of the mixture was adjusted to about 4.0 to 4.5 with 3.4 grams of 10% sulfuric acid in 25.0 grams of water. The mixture was maintained at about 65° C. for about 3 minutes. At the end of this time 18.0 grams of acrylamide, 0.1 gram of sodium bisulfite and 100 grams of water were added and the mixture was maintained at 54° to 57° C. for an additional 8 minutes. Following the addition of 18.0 grams of a 0.125% aqueous solution of ammonium persulfate over a 118 minute period, during which time the reaction mixture was slowly heated to 89° C., the resin solution became a viscous syrup at the point of incipient gelation. 485.0 grams of water and 1.5 grams of hydroquinone were then added to thin out the mixture and prevent further polymerization. When cooled to room temperature there resulted an aqueous solution of a cationic acrylamide glyoxal polymer having a viscosity of 12.5 centistokes at 25° C., a pH of 4.1 and a non-volatile solids content of 4.3%.

EXAMPLE 12

Into a reaction flask equipped with a mechanical stirrer, thermometer, addition funnel and reflux condenser were placed 18.0 grams of acrylamide, 36.0 grams of a 40% by weight solution of glyoxal in water, 325.0 grams of water and 1.3 grams of N,N-dimethylaminoethylmethacrylate. The reaction mixture was slowly heated and maintained at 60°–70° C. for about 15 minutes.

The pH of the mixture was adjusted to about 4.0 to 4.5 with 3.4 grams of 10% sulfuric acid in 25.0 grams of water. The mixture was maintained at about 65° C. for about 4 minutes. At the end of this time 18.0 grams of acrylamide, 0.1 gram of sodium bisulfite and 100 grams of water were added and the mixture was maintained at 55° to 60° C. for an additional 7 minutes. Following the addition of 14.0 grams of a 0.125% aqueous solution of ammonium persulfate over a period of 93 minutes, during which time the reaction mixture was slowly heated to 83° C., the resin solution became a viscous syrup at the point of incipient gelation. 485.0 grams of water and 1.5 grams of hydroquinone were then added to thin out the mixture and prevent further polymerization. When cooled to room temperature there resulted an aqueous solution of a cationic acrylamide glyoxal polymer having a viscosity of 14.5 centistokes at 25° C., a pH of 4.0 and a non-volatile solids content of 4.0%.

EXAMPLE 13

Into a reaction flask equipped with a mechanical stirrer, thermometer, addition funnel and reflux condenser were placed 18.0 grams of acrylamide, 36.0 grams of a 40% by weight solution of glyoxal in water, 75.0 grams of isopropyl alcohol, 250.0 grams of water and 1.3 grams of N,N-dimethylaminothylacrylate. The reaction mixture was slowly heated and maintained at 60°–70° C. for about 15 minutes.

The pH of the mixture was adjusted to about 4.0 to 4.5 with 3.5 grams of 10% sulfuric acid in 2.5 grams of water. The mixture was maintained at 72° C. for about 5 minutes. At the end of this time 18.0 grams of acrylamide, 0.1 gram of sodium bisulfite and 100.0 grams of water were added and the mixture was maintained at 70° to 73° C. until the resin solution became a viscous syrup at the point of incipient gelation (about 6 minutes). 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 8.0 centistrokes at 25° C., a pH of 3.5 and a non-volatile solids content of 5.8%.

EXAMPLE 14

Into a reaction flask equipped with a mechanical stirrer, thermometer, addition funnel and reflux condenser were placed 18.0 grams of acrylamide, 36.0 grams of a 40% by weight solution of glyoxal in water, 7.0 grams of isopropyl alcohol, 250.0 grams of water and 4.0 grams of N,N-dimethylaminoethylacrylate. The reaction mixture was slowly heated and maintained at 60°–70° C. for about 15 minutes.

The pH of the mixture was adjusted to adjusted to about 4.0 to 4.5 with 10.8 grams of 10% sulfuric acid. The mixture was maintained at between 68° and 70° C. for about 10 minutes. At the end of this time 18.0 grams of acrylamide, 0.1 gram of sodium bisulfite and 100.0 grams of water were added and the mixture was maintained at 66° C. until the resin solution became a viscous syrup at the point of incipient gelation (about 4.0 minutes). 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 7.5 centistokes at 25° C., a pH of 3.5 and a non-volatile solids content of 5.8%.

EXAMPLE 15

Into a reaction flask equipped with a mechanical stirrer, thermometer, addition funnel an reflux condenser were placed 18.0 grams of acrylamide, 36.0 grams of a 40% by weight solution of glyoxal in water, 75.0 grams of isopropyl alcohol, 250.0 grams of water and 4.0 grams of N,N-dimethylaminoethylacrylate. The reaction mixture was slowly heated and maintained at 60°–70° C. for about 15 minutes.

The pH of the mixture was adjusted to about 4.0 to 4.5 with 10.8 grams of 10% sulfuric acid. The mixture was maintained at 67° C. for about 7 minutes. At the end of this time 18.0 grams of acrylamide and 100 grams of water were added and the mixture was maintained at 57° to 60° C. for an additional 10 minutes. Following the addition of 10.0 grams of a 0.125% aqueous solution of ammonium persulfate the reaction mixture was slowly heated to 82° C. until the resin solution became a viscous syrup at the point of incipient gelation (about 18 minutes). 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 5.0 centistokes at 25° C., a pH of 3.5 and a non-volatile solids content of 5.8%.

EXAMPLE 16

Into a reaction flask equipped with a mechanical stirrer, thermometer, addition funnel and reflux condenser were placed 18.0 grams of acrylamide, 36.0 grams of a 40% by weight solution of glyoxal in water, 250.0 grams of water and 1.3 grams of N,N-dimethylaminoethylacrylate. The reaction mixture was slowly heated and maintained at 60°–70° C. for about 15 minutes.

The pH of the mixture was adjusted to about 4.0 to 4.5 with 3.5 grams of 10% sulfuric acid in 2.5 grams of water. The mixture was maintained at between 67° and 70° C. for about 8 minutes. At the end of this time 18.0 grams of acrylamide, 0.1 gram of sodium bisulfite and 100.0 grams of water were added and the mixture was maintained at 60° to 70° C. for an additional 91 minutes. Following the addition of 40 grams of a 0.125% aqueous solution of ammonium persulfate over a period of 50 minutes, during which time the reaction mixture was slowly heated to 73° C., the resin solution became a viscous syrup at the point of incipient gelation. 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 7.2 centistokes at 25° C., a pH of 3.7 and a non-volatile solids content of 5.2%.

EXAMPLE 17

Into a reaction flask equipped with a mechanical stirrer, thermometer, addition funnel and reflux condenser were placed 18.0 grams of acrylamide, 36.0 grams of a 40% by weight solution of glyoxal in water, 75.0 grams of isopropyl alcohol, 250.0 grams of water and 1.3 grams of N-tertiary butyl aminoethylmethacrylate. The reaction mixture was slowly heated and maintained at 60°–70° C. for about 15 minutes.

The pH of the mixture was adjusted to about 4.0 to 4.5 with 3.5 grams of 10% sulfuric acid in 2.5 grams of water. The mixture was maintained at about 73° C. for about 3 minutes. At the end of this time 18.0 grams of acrylamide, 0.1 gram of sodium bisulfite and 100 grams of water were added and the mixture was maintained at 66° C. for an additional 3 minutes. Following the addition of 10.0 grams of a 0.125% aqueous solution of ammonium persulfate the reaction mixture was slowly heated to 75° C. until the resin solution became a viscous syrup at the point of incipient gelatin (about 5 minutes). 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 9.0 centistokes at 25° C., a pH of 3.5 and a nonvolatile solids content of 5.7%.

EXAMPLE 18

Into a reaction flask equipped with a mechanical stirrer, thermometer, addition funnel and reflux condenser were placed 18.0 grams of acrylamide, 36.0 grams of a 40% by weight solution of glyoxal in water, 75.0 grams of isopropyl alcohol, 250.0 grams of water and 4.0 grams of N-tertiary butyl aminoethylmethacrylate. The reaction mixture was slowly heated and maintained at 60°–70° C. for about 15 minutes.

The pH of the mixture was adjusted to about 4.0 to 4.5 with 11.5 grams of 10% sulfuric acid. The mixture was maintained at about 72° C. for about 10 minutes. At the end of this time 18.0 grams of acrylamide, 0.1 gram of sodium bisulfite and 100.0 grams of water were added and the mixture was maintained at 61° C. for an additional 5 minutes. Following the addition of 10.0 grams of a 0.125% aqueous solution of ammonium persulfate the reaction mixture was slowly heated to 67° C. until the resin solution became a viscous syrup at the point of incipient gelation (about 30 minutes). 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 13.8 centistokes at 25° C., a pH of 3.4 and a non-volatile solids content of 5.4%.

EXAMPLE 19

Into a reaction flask equipped with a mechanical stirrer, thermometer, addition funnel and reflux condenser were placed 18.0 grams of acrylamide, 36.0 grams of a 40% by weight solution of glyoxal in water, 325.0 grams of water and 1.3 grams of N-tertiary butyl aminoethylmethacrylate. The reaction mixture was slowly heated and maintained at 60°–70° C. for about 15 minutes.

The pH of the mixture was adjusted to about 4.0 to 4.5 with 3.5 grams of 10% sulfuric acid in 2.5 grams of water. The mixture was maintained at about 70° C. for about 15 minutes. At the end of this time 18.0 grams of acrylamide, 0.1 gram of sodium bisulfite and 100 grams of water were added and the mixture was maintained at 55° to 65° C. for an additional 10 minutes. Following the addition of 10.0 grams of a 0.125% aqueous solution of ammonium persulfate the reaction mixture was slowly heated to 67° C. until the resin solution became a viscous syrup at the point of incipient gelation (about 18 minutes). 685.0 grams of water and 1.5 grams of hydroquinone were then added to thin out the mixture and prevent further polymerization. When cooled to room temperature there resulted an aqueous solution of a cationic acrylamide glyoxal polymer having a viscosity of 21.6 centistokes at 25° C., a pH of 3.2 and a non-volatile solids content of 4.3%.

EXAMPLE 20

Into a reaction flask equipped with a mechanical stirrer, thermometer, addition funnel and reflux condenser were placed 18.0 grams of acrylamide, 36.0 grams of a 40% by weight solution of glyoxal in water, 75.0 grams of isopropyl alcohol, 250.0 grams of water and 4.0 grams of 4-vinylpyridine. The reaction mixture was slowly heated and maintained at 60°–70° C. for about 15 minutes.

The pH of the mixture was adjusted to about 4.0 to 4.5 with 14.0 grams of 10% sulfuric acid. The mixture was maintained at about 69° C. for about 15 minutes. At the end of this time 18.0 grams of acrylamide, 0.1 gram of sodium bisulfite and 100.0 grams of water were added and the mixture was maintained at 68° C. for an additional 5 minutes. Following the addition of 0.4 gram of a 0.125% aqueous solution of ammonium persulfate over a period of 311 minutes, during which time the reaction mixture was maintained at 68°–74° C., the resin solution became a viscous syrup at the point of incipient gelatin. 385.0 grams of water and 1.5 grams of hydroquinone were then added to thin out the mixture and prevent further polymerization. When cooled to room temperature there resulted an aqueous solution of a cationic acrylamide glyoxal polymer having a viscosity of 7.6 centistokes at 25° C., a pH of 3.1 and a non-volatile solids content of 6.2%.

EXAMPLE 21

The following table illustrates the properties achieved by utilizing the resins prepared in the above examples. All the data presented was obtained from handsheets prepared on a Noble and Wood Handsheet machine, without a whitewater system, from bleached, West-coast, sulfite pulp having a Canadian freeness of 450–500 cc. The pH of the pulp slurry was controlled with either mineral acid or a dilute sodium hydroxide solution, as required. Resin was added to the pulp slurry prior to sheet formation. Tensile measurements were obtained on a Thwing-Albert Tensile Tester in accordance with TAPPI Standard Number T 456m-49. Tensile was measured for a dry strip (D.T.), a wet strip (W.T.) and a strip soaked for 10 minutes in household ammonia containing approximately 4.5% $NH_3$ ($NH_3$ soak). All tensile values are reported as ounces/inch.

TABLE

| Resin | 0.5% resin at pH=6.0 | | | 1.0% resin at pH=6.0 | | | 2.0% resin at pH=6.0 | | |
|---|---|---|---|---|---|---|---|---|---|
| | D.T. | W.T. | $NH_3$ soak | D.T. | W.T. | $NH_3$ soak | D.T. | W.T. | $NH_3$ soak |
| None | 133 | 1.5 | 3.6 | 133 | 1.5 | 3.6 | 153 | 1.5 | 3.6 |
| Example 1 | 151 | 26 | 8 | 163 | 36 | 13 | 168 | 48 | 24 |
| Example 3 | 176 | 29 | 7 | 176 | 39 | 14 | 187 | 51 | 24 |
| Example 4 | 155 | 24 | 11 | 163 | 35 | 17 | 171 | 47 | 32 |
| Example 5 | 140 | 17 | 7 | 156 | 33 | 12 | 176 | 50 | 23 |
| Example 6 | 126 | 24 | 7 | 142 | 31 | 9 | 175 | 45 | 26 |
| Example 7 | 138 | 21 | 7 | 144 | 30 | 9 | 179 | 42 | 22 |
| Example 8 | 124 | 21 | 4 | 144 | 28 | 7 | 178 | 38 | 14 |
| Example 9 | 136 | 16 | 7 | 144 | 22 | 9 | 164 | 42 | 17 |
| Example 10 | 170 | 27 | 7 | 173 | 36 | 12 | 205 | 52 | 65 |
| Example 11 | 152 | 17 | 9 | 167 | 27 | 13 | 187 | 38 | 23 |
| Example 12 | 155 | 22 | 8 | 155 | 32 | 13 | 189 | 45 | 23 |
| Example 13 | 162 | 29 | 6 | 191 | 44 | 10 | 205 | 59 | 17 |
| Example 14 | 180 | 35 | 6 | 197 | 43 | 13 | 206 | 55 | 15 |
| Example 15 | 179 | 36 | 6 | 185 | 44 | 8 | 154 | 55 | 14 |
| Example 16 | 117 | 7 | 4 | 128 | 12 | 5 | 123 | 16 | 5 |
| Example 17 | 146 | 29 | 8 | 154 | 39 | 14 | 154 | 48 | 20 |
| Example 18 | 164 | 33 | 10 | 181 | 48 | 18 | 193 | 58 | 28 |
| Example 19 | 143 | 21 | 6 | 150 | 32 | 8 | 154 | 44 | 14 |
| Example 20 | 170 | 30 | 7 | 170 | 40 | 11 | 184 | 55 | 19 |

What is claimed is:

1. A process for preparing cationic, neutral-curing, wet-strength resins which comprises
    (a) reacting glyoxal and acrylamide at an alkaline pH to obtain glyoxalolated acrylamide, and
    (b) subsequently polymerizing the glyoxalolated acrylamide with acrylamide in the presence of a basic nitrogen-containing monomer which imparts a cationic character to the resulting polymer said polymerization reaction being carried out at an acidic pH.

2. A process, as described in claim 1, in which the basic nitrogen-containing monomer is seelcted from the group consisting of 2-vinyl pyridine, 4-vinyl pyridine, n-tertiary butyl aminoethylmethacrylate and compounds of the general formula

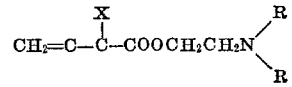

wherein

R is methyl or ethyl, and
X is hydrogen or methyl.

3. A cationic, neutral-curing, wet-strength resin prepared by the process of claim 1.

4. A wet-strength paper which comprises cellulosic fibers which have been treated with a resin prepared as in claim 1.

5. A process for preparing wet-strength paper which comprises treating cellulosic fibers at a point prior to the wire, or sheet forming stage, with an aqueous solution of a resin prepared as in claim 1.

References Cited

UNITED STATES PATENTS

| | | | |
|---|---|---|---|
| 2,173,005 | 9/1939 | Strain | 260—72 |
| 2,886,557 | 5/1959 | Talet | 260—72 |
| 3,556,933 | 1/1971 | Williams et al. | 260—72 X |
| 3,556,932 | 1/1971 | Coscia et al. | 260—72 X |
| 2,616,818 | 11/1952 | Azorlosa et al. | 260—72 X |

OTHER REFERENCES

Chem. Abstracts, vol. 64, 1966, 1951d-h, Yoshizawa et al.

HOWARD E. SCHAIN, Primary Examiner

U.S. Cl. X.R.

162—183; 260—29.4 R, 72 R

PO-1050
(5/69)

UNITED STATES PATENT OFFICE
CERTIFICATE OF CORRECTION

Patent No. 3,709,857      Dated January 9, 1973

Inventor(s) R. W. Faessinger

It is certified that error appears in the above-identified patent and that said Letters Patent are hereby corrected as shown below:

Column 4, line 69, "gelatin" should be --gelation--
Column 5, line 21, "gelatin" should be --gelation--
         line 47, "perior" should be --period--
Column 6, line 61, "cation" should be --cationic--

Column 9, line 5, "7.0" should be --75.0--
         line 11, delete "adjusted to" - second occurrence
Column 10, line 24, "gelatin" should be --gelation--
Column 11, line 51, "gelatin" should be --gelation--
Column 12, at Example 10, last column, "65" should be --25--
         line 35, "seelcted" should be --selected--

Signed and sealed this 13th day of August 1974.

(SEAL)
Attest:

McCOY M. GIBSON, JR.          C. MARSHALL DANN
Attesting Officer             Commissioner of Patents